United States Patent
Yoshida et al.

(10) Patent No.: US 9,630,656 B2
(45) Date of Patent: Apr. 25, 2017

(54) VEHICLE BODY STRUCTURE

(71) Applicant: HONDA MOTOR CO., LTD., Tokyo (JP)

(72) Inventors: Masayasu Yoshida, Wako (JP); Tomohito Kamada, Wako (JP); Akira Haga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/069,379

(22) Filed: Mar. 14, 2016

(65) Prior Publication Data

US 2016/0272253 A1 Sep. 22, 2016

(30) Foreign Application Priority Data

Mar. 17, 2015 (JP) .................................. 2015-053121

(51) Int. Cl.
*B62D 25/14* (2006.01)
*B62D 25/20* (2006.01)

(52) U.S. Cl.
CPC ......... *B62D 25/14* (2013.01); *B62D 25/2018* (2013.01); *B62D 25/2036* (2013.01)

(58) Field of Classification Search
CPC . B62D 25/14; B62D 25/2036; B62D 25/2018
USPC .................................................. 296/204, 70
See application file for complete search history.

(56) References Cited

U.S. PATENT DOCUMENTS

| 7,025,411 | B2* | 4/2006 | Dettinger | B62D 25/14 |
|---|---|---|---|---|
| | | | | 296/193.02 |
| 7,832,795 | B2* | 11/2010 | Yokoi | B62D 25/2018 |
| | | | | 296/193.02 |
| 2016/0272248 | A1* | 9/2016 | Furusaki | B62D 21/152 |
| 2016/0272252 | A1* | 9/2016 | Park | B62D 25/14 |

FOREIGN PATENT DOCUMENTS

JP 2013-169806 A 9/2013

* cited by examiner

*Primary Examiner* — Pinel Romain
(74) *Attorney, Agent, or Firm* — Westerman, Hattori, Daniels & Adrian, LLP

(57) ABSTRACT

A vehicle body structure includes a dash lower panel including a wheel-arch-shaped portion that constitutes a portion of a wheel arch and separating a power unit chamber from a vehicle interior, a reinforcing panel covering the wheel-arch-shaped portion from a side of the vehicle interior, and a side sill extending in a front-rear direction and having a front end portion connected to an end portion in a vehicle width direction of the dash lower panel. The reinforcing panel includes a horizontal closed cross-section defining portion that defines a closed cross-section extending in the vehicle width direction in combination with the wheel-arch-shaped portion and a vertical closed cross-section defining portion that defines a closed cross-section extending in a vertical direction in combination with the wheel-arch-shaped portion. The horizontal closed cross-section defining portion and the vertical closed cross-section defining portion intersect each other.

17 Claims, 9 Drawing Sheets

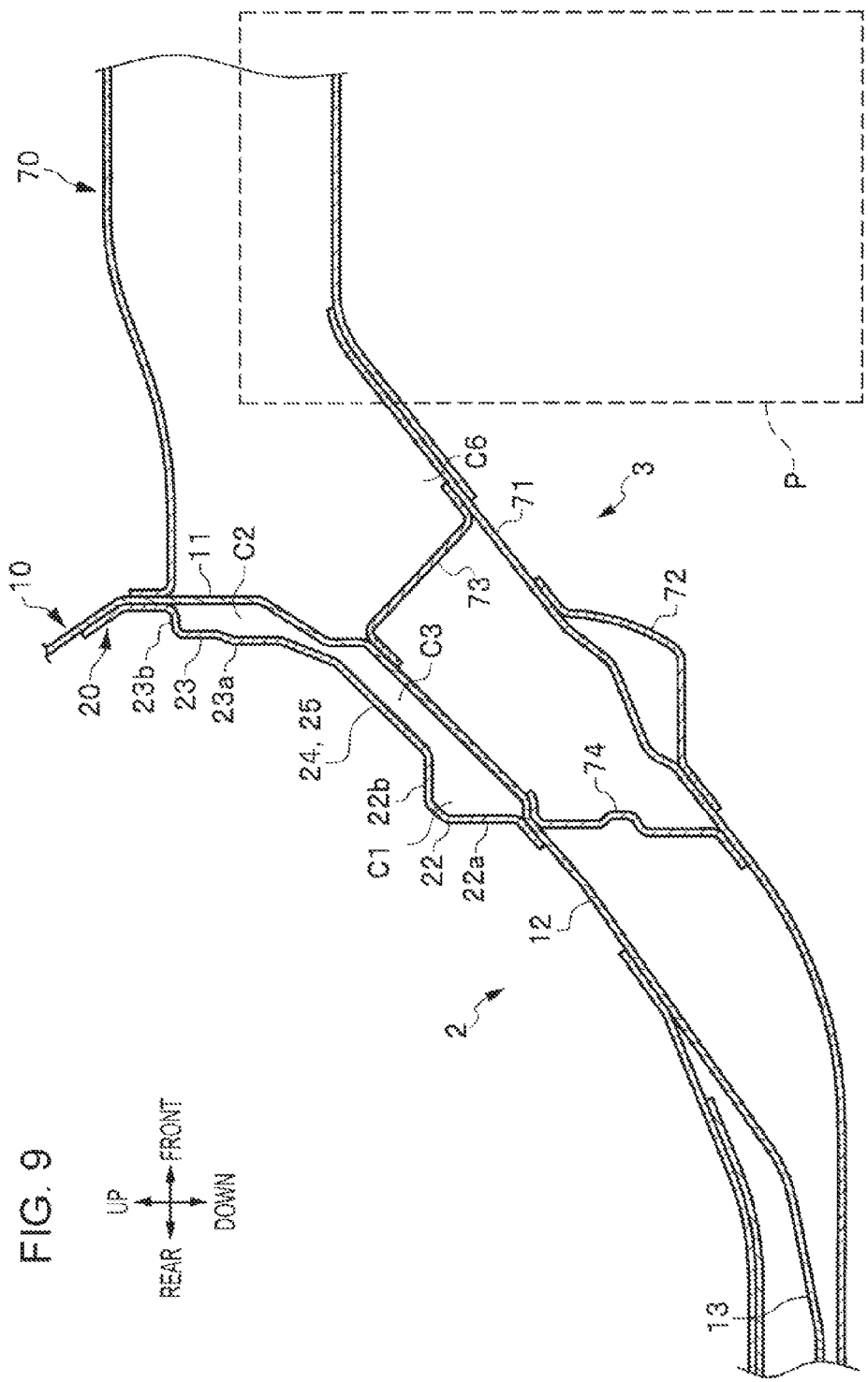

VEHICLE BODY STRUCTURE

CROSS REFERENCES TO RELATED APPLICATIONS

The present application claims priority under 35 U.S.C. §119 to Japanese Patent Application No. 2015-053121, filed Mar. 17, 2015, entitled "Vehicle Body Structure." The contents of this application are incorporated herein by reference in their entirety.

TECHNICAL FIELD

The present disclosure relates to a vehicle body structure, particularly to a vehicle body structure around a dash lower panel.

BACKGROUND

Japanese Unexamined Patent Application Publication No. 2013-169806 (Claim 1 and FIG. 1) discloses a structure of a vehicle body lower section, which includes left and right side sills extending in a front-rear direction of a vehicle along outer ends in a vehicle width direction of a vehicle body. The structure of the vehicle body lower section includes a dashboard cross member and outriggers. The dashboard cross member, which extends in the vehicle width direction, is connected to a front end of each of the left and right side sills. The outriggers, which extend in the vehicle width direction, are coupled to a rear end of a front side frame and connected to the front end of each of the left and right side sills. A dashboard lower section (dash lower panel), which includes a wheel housing portion (wheel-arch-shaped portion), is sandwiched between and connected to the dashboard cross member and the outriggers. In addition, a gadget, which extends in the vehicle width direction, is disposed on a rear surface of the wheel housing portion. With this configuration, the dashboard lower section moves less toward the rear during application of a narrow offset impact load.

In the above-described known technique, the dashboard cross member reduces deformation of a lower section of the wheel-arch-shaped portion, but the gadget, which is a separate member, is required to be mounted above the dashboard cross member in order to reduce deformation of the overall wheel-arch-shaped portion. This increases the number of components, leading to a complex production process. In addition, the dashboard cross member is required to have a larger thickness to have higher rigidity and strength, leading to an increase in the weight of the dashboard cross member.

SUMMARY

The present application describes, for example, a vehicle body structure in which the wheel-arch-shaped portion has improved rigidity and strength, while an increase in the number of components and the weight is reduced.

In one aspect, a vehicle body structure according to the present application includes a dash lower panel that includes a wheel-arch-shaped portion which constitutes a portion of a wheel arch and that separates a power unit chamber from a vehicle interior, a reinforcing panel covering the wheel-arch-shaped portion from a side of the vehicle interior, and a side sill extending in a front-rear direction and having a front end portion connected to an end portion in a vehicle width direction of the dash lower panel. The reinforcing panel includes a horizontal closed cross-section defining portion that defines a closed cross-section extending in the vehicle width direction in combination with the wheel-arch-shaped portion and a vertical closed cross-section defining portion that defines a closed cross-section extending in a vertical direction in combination with the wheel-arch-shaped portion. The horizontal closed cross-section defining portion and the vertical closed cross-section defining portion intersect each other.

With this configuration, the reinforcing panel improves the rigidity and strength of the wheel-arch-shaped portion in the vehicle width direction and the vertical direction, since the reinforcing panel includes the horizontal closed cross-section defining portion, which defines the closed cross-section extending in the vehicle width direction in combination with the wheel-arch-shaped portion, and the vertical closed cross-section defining portion, which defines the cross-section extending in the vertical direction in combination with the wheel-arch-shaped portion. The reinforcing panel having the above-described configuration reduces deformation of the wheel-arch-shaped portion toward the vehicle interior when the front wheel comes in contact with the wheel-arch-shaped portion due to a narrow offset collision (small overlap collision) or an oblique collision. In addition, the number of components does not increase, since the reinforcing panel integrally includes the horizontal closed cross-section defining portion and the vertical closed cross-section defining portion. In addition, the thickness of the reinforcing panel does not increase, since the rigidity and strength of the reinforcing panel is improved by the configuration in which the horizontal closed cross-section defining portion and the vertical closed cross-section defining portion intersect each other.

The vehicle body structure may further include a tunnel member connected to a middle portion in the vehicle width direction of the dash lower panel. The horizontal closed cross-section defining portion may include at least two horizontal closed cross-section defining portions positioned away from each other in the vertical direction. A lowest one of the horizontal closed cross-section defining portions may constitute a dash cross member in combination with a horizontal member that is a separate member. The dash cross member extends from the side sill to the tunnel member.

With this configuration, the dash cross member improves the rigidity and strength of the components between the side sill and the tunnel member, since the lowest horizontal closed cross-section defining portion constitutes the dash cross member, which extends from the side sill to the tunnel member, in combination with the horizontal member, which is a separate member. Thus, the dash cross member prevents the power unit from moving further rearward during a collision if moved rearward due to the collision, for example.

The side sill may be a hollow member including a side sill inner panel on an inner side in the vehicle width direction and a side sill outer panel on an outer side in the vehicle width direction. The horizontal closed cross-section defining portion may include a flange extending rearward from an outer end portion in the vehicle width direction. A front end portion of the side sill inner panel may be connected to an inner surface in the vehicle width direction of the flange in an overlapped state.

In the above-described configuration, the horizontal closed cross-section defining portion includes the flange extending rearward from the outer end portion in the vehicle width direction. The front end portion of the side sill inner panel is connected to the inner surface in the vehicle width direction of the flange in an overlapped state. Thus, if the flange is detached from the side sill inner panel due to a collision, the reinforcing panel will come in contact with the front end portion of the side sill inner panel, and thus the side sill will support the collision load.

The vehicle body structure may further include an outrigger extending in the vehicle width direction on an opposite side of the dash lower panel from the horizontal closed cross-section defining portion, and a jack-up stiffener disposed in a front end portion of the side sill. The jack-up stiffener extends in a front-rear direction at a position between the side sill inner panel and the side sill outer panel. The jack-up stiffener may include a stiffener flange extending in the vehicle width direction from the front end and connected to an outer end portion in the vehicle width direction of the outrigger in an overlapped state.

In the above-described configuration, the jack-up stiffener includes the stiffener flange extending in the vehicle width direction from the front end and connected to the outer end portion in the vehicle width direction of the outrigger in an overlapped state. In such a state, the closed cross-section extending in the vehicle width direction, which is defined by the dash lower panel and the horizontal closed cross-section defining portion, is connected to the front end portion of the closed cross-section extending in the front-rear direction, which is defined by the jack-up stiffener and the side sill inner panel, through the outrigger. With this configuration, a load is properly transmitted from the closed cross-section extending in the vehicle width direction (dash cross member, for example) to the closed cross-section extending in the front-rear direction (side sill).

The vehicle body structure may further include a front side frame extending in a front-rear direction in the power unit chamber with a rear end portion thereof being connected to the dash lower panel. The rear end portion of the front side frame may have a curved portion that extends downward and defines a closed cross-section in combination with the dash lower panel. The vertical closed cross-section defining portion may be disposed on an opposite side of the dash lower panel from the curved portion.

With the above-described configuration, the curved portion is reinforced by the vertical closed cross-section defining portion, since the vertical closed cross-section defining portion is positioned on the opposite side of the dash lower panel from the curved portion. This configuration enables the front side frame to be properly deformed during a narrow offset collision or a front collision to effectively absorb impact energy and this configuration reduces deformation of the dash lower panel toward the vehicle interior.

The vehicle body structure may further include an outrigger extending in the vehicle width direction on an opposite side of the dash lower panel from the horizontal closed cross-section defining portion. The reinforcing panel may be connected to the outrigger at positions above and below the horizontal closed cross-section defining portion with the wheel-arch-shaped portion being disposed therebetween. The outrigger defines a closed cross-section in front of the horizontal closed cross-section defining portion in combination with the wheel-arch-shaped portion.

In this configuration, the reinforcing panel is connected to the outrigger at the positions above and below the first horizontal closed cross-section defining portion with the wheel-arch-shaped portion being disposed therebetween, and the outrigger defines the closed cross-section at a position in front of the first horizontal closed cross-section defining portion in combination with the wheel-arch-shaped portion at a position. In such a state, two closed cross-sections each extending in the vehicle width direction are arranged in the front-rear direction with the wheel-arch-shaped portion being disposed therebetween. This configuration improves the rigidity and strength of the wheel-arch-shaped portion, reducing deformation of the wheel-arch-shaped portion.

The reinforcing panel may be formed by a hot stamping process.

The hot stamping process is also referred to as a hot pressing process, in which a steel plate, which is heated to be softened, is subjected to a pressing process and hardened at the same time by a cooling effect due to contact with a metal die. The heating of the steel plate for softening reduces spring back of the steel plate, improving dimensional accuracy, and the hardening improves strength of the produced member. With this configuration, less dimensional error occurs in the reinforcing panel integrally including the closed cross-section defining portions, which extend in the vehicle width direction, and the vertical closed cross-section defining portion, which extends in the vertical direction and intersects the closed cross-section defining portions, since the reinforcing panel is formed by the hot stamping process. In addition, both the improvement in rigidity and strength and the reduction in weight are achieved, since the reinforcing panel has higher strength due to the hardening.

An upper edge portion of the reinforcing panel may be connected to a general portion of the dash lower panel at a position outward from a ridge that is a border between the general portion and the wheel-arch-shaped portion in the dash lower panel.

In this configuration, the reinforcing panel reinforces a portion around the ridge, since the upper edge portion of the reinforcing panel is connected to the general portion of the dash lower panel at the position outward from the ridge. This configuration reduces deformation of the wheel-arch-shaped portion toward the vehicle interior during a collision.

The horizontal closed cross-section defining portion may include an upper wall extending horizontally. The upper wall may have a maximum width in the front-rear direction at a position corresponding to a ridge that is a border between a general portion and the wheel-arch-shaped portion in the dash lower panel.

In the above-described configuration, the upper wall of the horizontal closed cross-section defining portion has the maximum width in the front-rear direction at the portion corresponding to the ridge. This configuration effectively reinforces a portion around the ridge where stress concentrates and reduces protrusion of the horizontal closed cross-section defining portion toward the vehicle interior to provide a larger vehicle interior space.

The present application describes, for example, a vehicle body structure in which the wheel-arch-shaped portion has improved rigidity and strength, while an increase in the number of components and weight is reduced.

BRIEF DESCRIPTION OF THE DRAWINGS

The advantages of the disclosure will become apparent in the following description taken in conjunction with the following drawings.

FIG. 9 is a vertical cross-sectional view viewed in a direction indicated by arrows IX-IX in FIG. 2.

DETAILED DESCRIPTION

Figure 1:
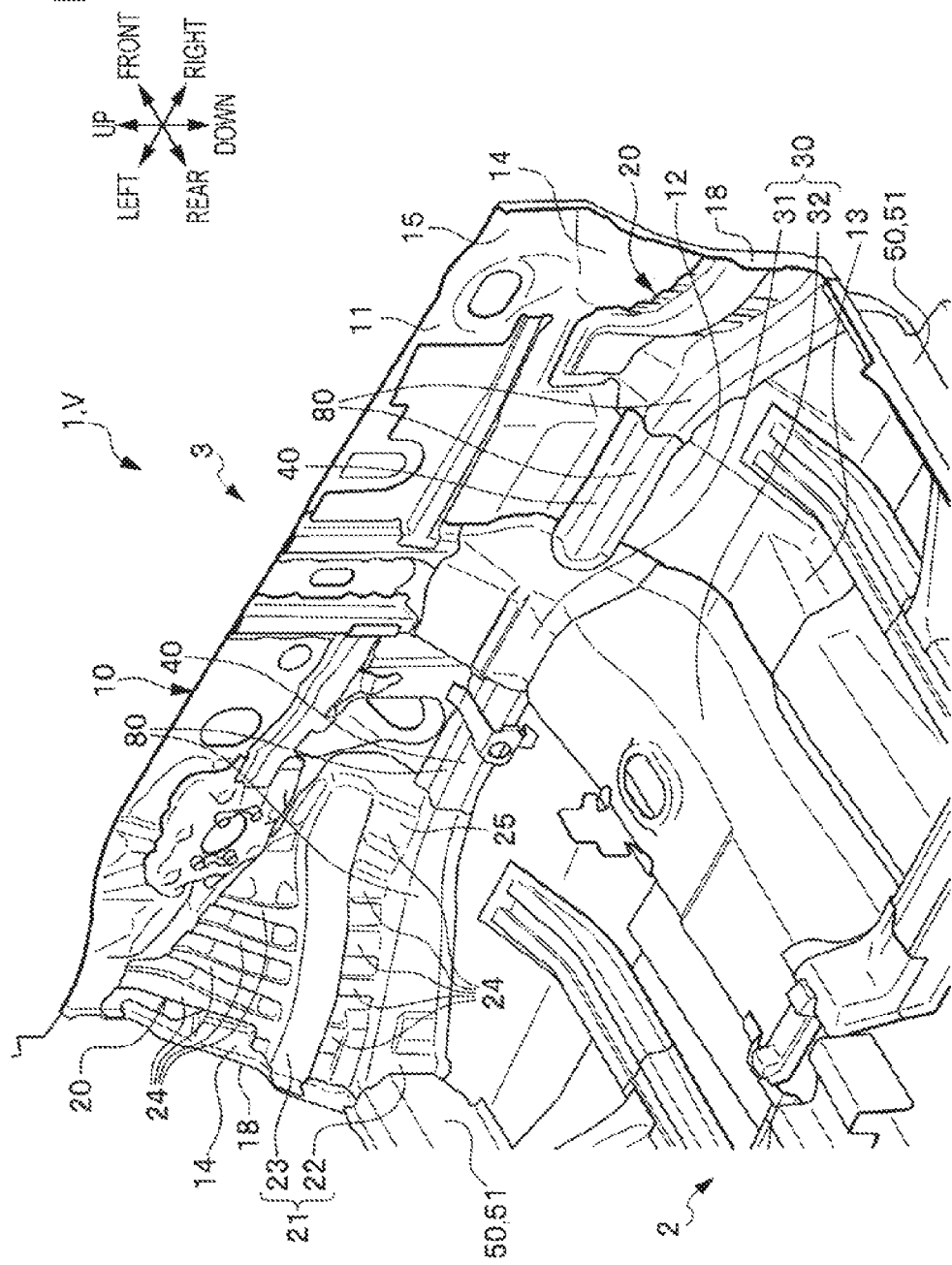
FIG. 1 is a perspective view of a vehicle body structure according to a present embodiment viewed obliquely from an upper right rear side.

An embodiment of the present disclosure is described in detail with reference to the drawings. Identical components are assigned the same reference numerals and are not repeatedly described. Directions such as front, rear, up, down, left, and right are relative to a driver. Vehicle width direction has the same meaning as the left-right direction.

Figure 2:
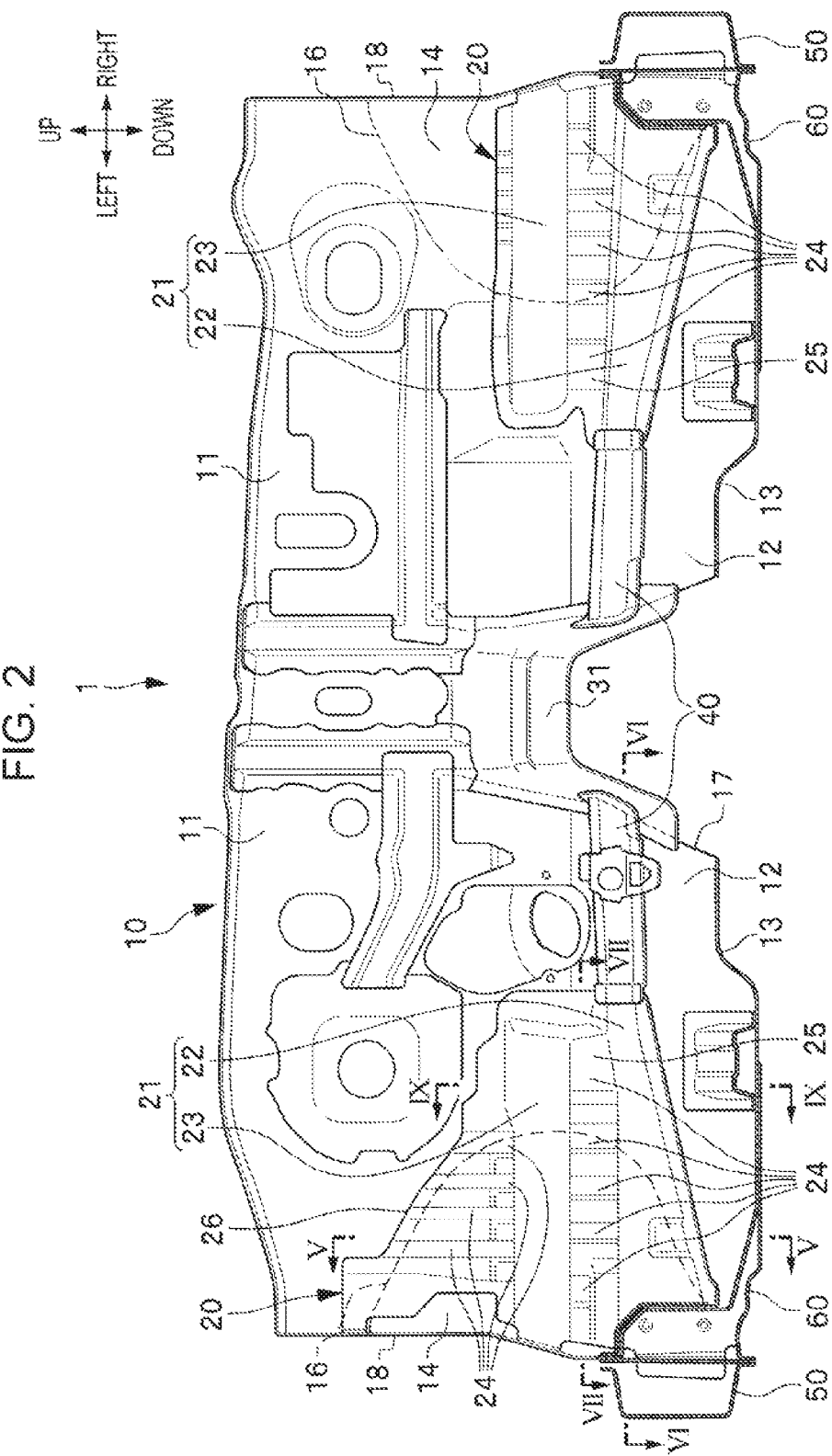
FIG. 2 is a rear view of the vehicle body structure viewed from rear.
Figure 3:
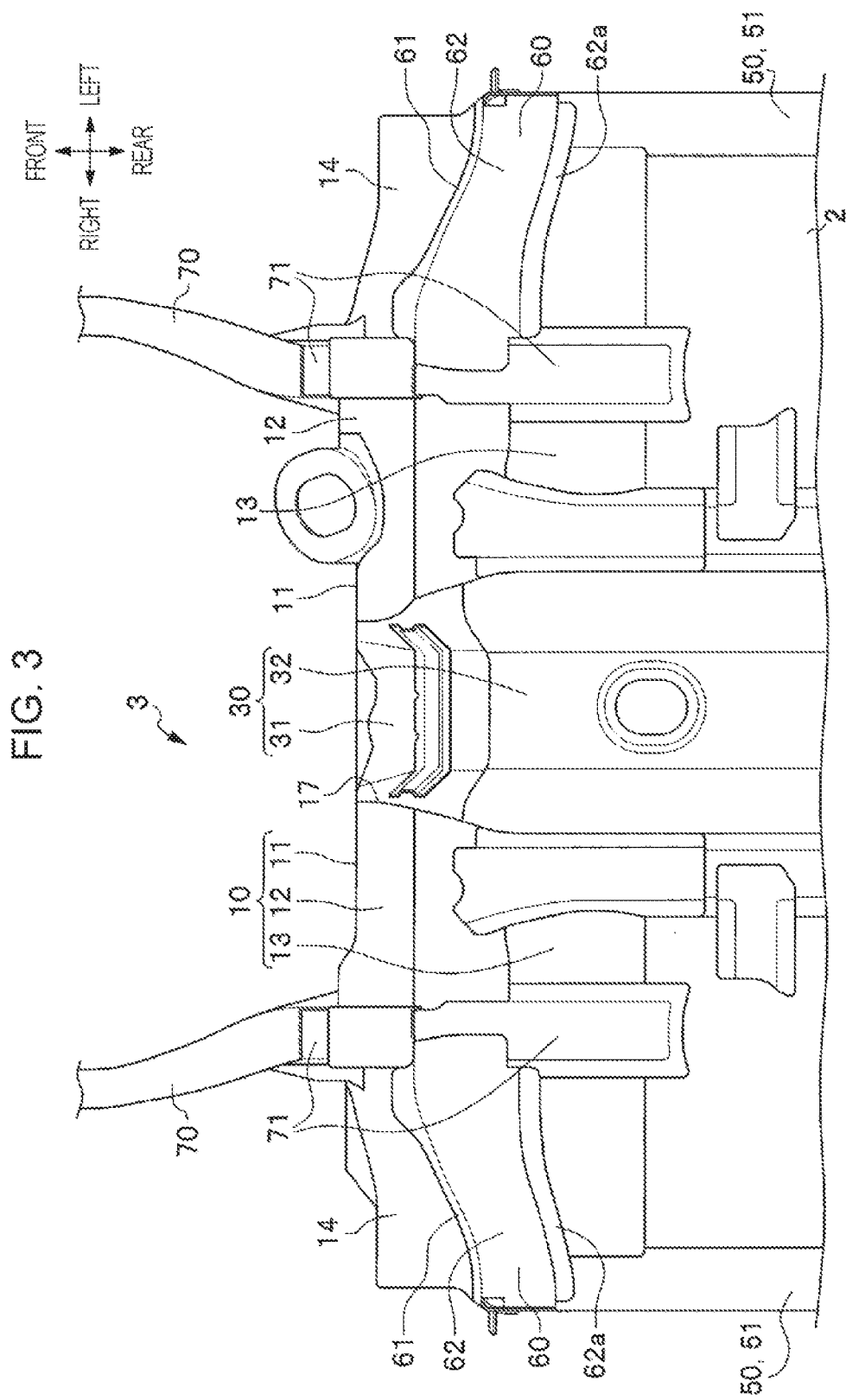
FIG. 3 is a bottom view of the vehicle body structure viewed from below.

As illustrated in FIG. 1, FIG. 2, and FIG. 3, an automobile V, which includes a vehicle body structure 1 according to a first embodiment, includes a dash lower panel 10 providing a front end of a vehicle interior 2, a reinforcing panel 20 covering a portion of the dash lower panel 10 from a side of the vehicle interior 2, side sills 50 each having a front end portion connected to an end portion in the vehicle width direction of the dash lower panel 10, and a tunnel member 30 connected to a middle portion in the vehicle width direction of the dash lower panel 10. The vehicle body structure 1 has a substantially symmetrical structure, and a left half (driver's seat side) of the vehicle body structure 1 is described mainly hereinafter.

The dash lower panel 10 is a partition plate and separates a power unit chamber 3, which is at a front side, from a vehicle interior 2, which is at a rear side. A high-tensile steel plate is pressed into a predetermined shape, for example, to obtain the dash lower panel 10. The dash lower panel 10 includes mainly a front panel 11 extending in a vertical direction and the vehicle width direction, a sloping portion 12 extending obliquely downward from a lower end of the front panel 11 toward the rear, a floor panel portion 13 extending substantially horizontally from a lower end of the sloping portion 12 toward the rear, and two wheel-arch-shaped portions 14 at the end portions in the vehicle width direction. In the following description, the portions of the dash lower panel 10 except for the wheel-arch-shaped portions 14 are collectively referred to as a general portion 15 in some cases.

The wheel-arch-shaped portion 14 is a portion of a wheel arch (not illustrated) configured to cover an upper half of a front wheel of the automobile V. The wheel-arch-shaped portion 14 has a spherical surface protruding toward the vehicle interior 2 and extending over the front panel 11 and the sloping portion 12. A ridge 16, which is a border between the wheel-arch-shaped portion 14 and the general portion 15 (mainly the front panel 11), is a fold line (ridge line) obtained by bending the dash lower panel 10. The ridge 16 extends in an arc in rear view (see FIG. 2).

The dash lower panel 10 has a cutout 17, which has an inverted U-shape opening downward, at the middle in the vehicle width direction. The cutout 17 extends over the front panel 11, the sloping portion 12, and the floor panel portion 13. The tunnel member 30, which is described in detail later, is connected to the cutout 17.

The dash lower panel 10 further includes dash flanges 18 extending from the ends in the vehicle width direction toward the rear. The dash flange 18 extends over the front panel 11, the wheel-arch-shaped portion 14, the sloping portion 12, and the floor panel portion 13. The side sill 50 and a front pillar lower section 4 (see FIG. 8) are connected to the dash flange 18. A floor panel is connected to a rear end of the floor panel portion 13.

As illustrated in FIG. 1, FIG. 2, and FIG. 4 to FIG. 7, two reinforcing panels 20, which are symmetric plate members, cover and reinforce the corresponding wheel-arch-shaped portions 14 from the side of the vehicle interior 2. A high tensile steel plate is subjected to a hot stamping process so as to have curved portions or concave and convex portions, and thus the reinforcing panel 20 having a predetermined complex shape is obtained. The reinforcing panel 20 has an inner end portion positioned inward from the wheel-arch-shaped portion 14 so as to cover a portion of the front plate 11 and a portion of the sloping portion 12 from the side of the vehicle interior 2. The reinforcing panel 20 includes a horizontal closed cross-section defining portion 21 extending in the vehicle width direction, and a vertical closed cross-section defining portion 24 extending in the vertical direction.

The horizontal closed cross-section defining portion 21 defines a closed cross-section, which extends in the vehicle width direction, in combination with the wheel-arch-shaped portion 14. The horizontal closed cross-section defining portion 21 is a portion of the reinforcing panel 20 and protrudes toward the vehicle interior 2. In this embodiment, the horizontal closed cross-section defining portion 21 includes a first horizontal closed cross-section defining portion 22, which is positioned on a lower side, and a second horizontal closed cross-section defining portion 23, which is positioned above the first horizontal closed cross-section defining portion 22 with a space therebetween. In this embodiment, the number of horizontal closed cross-section defining portions 21 is not limited.

Figure 4:
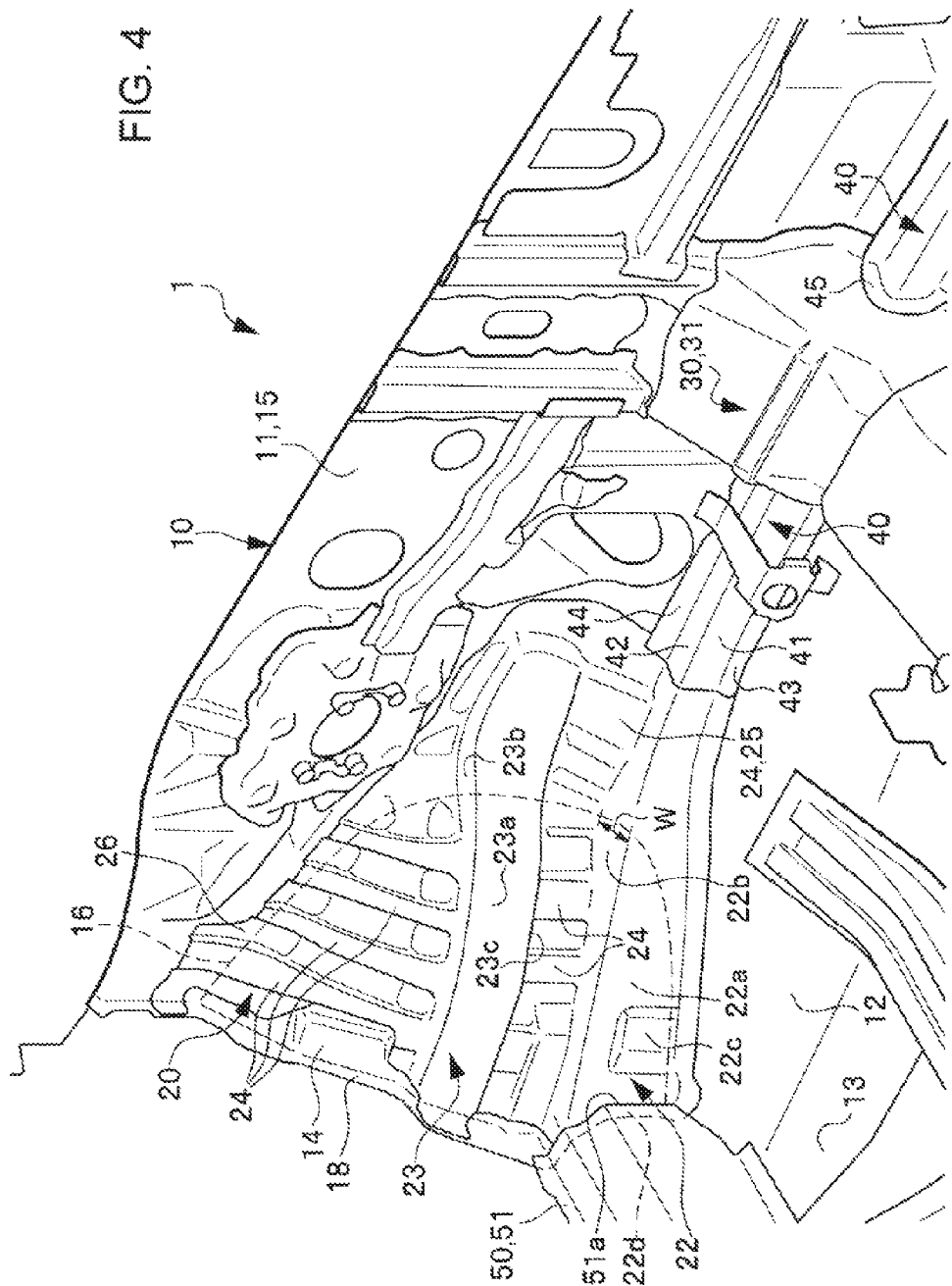
FIG. 4 is a perspective view illustrating a magnified left half of the vehicle body structure illustrated in FIG. 1.
Figure 5:
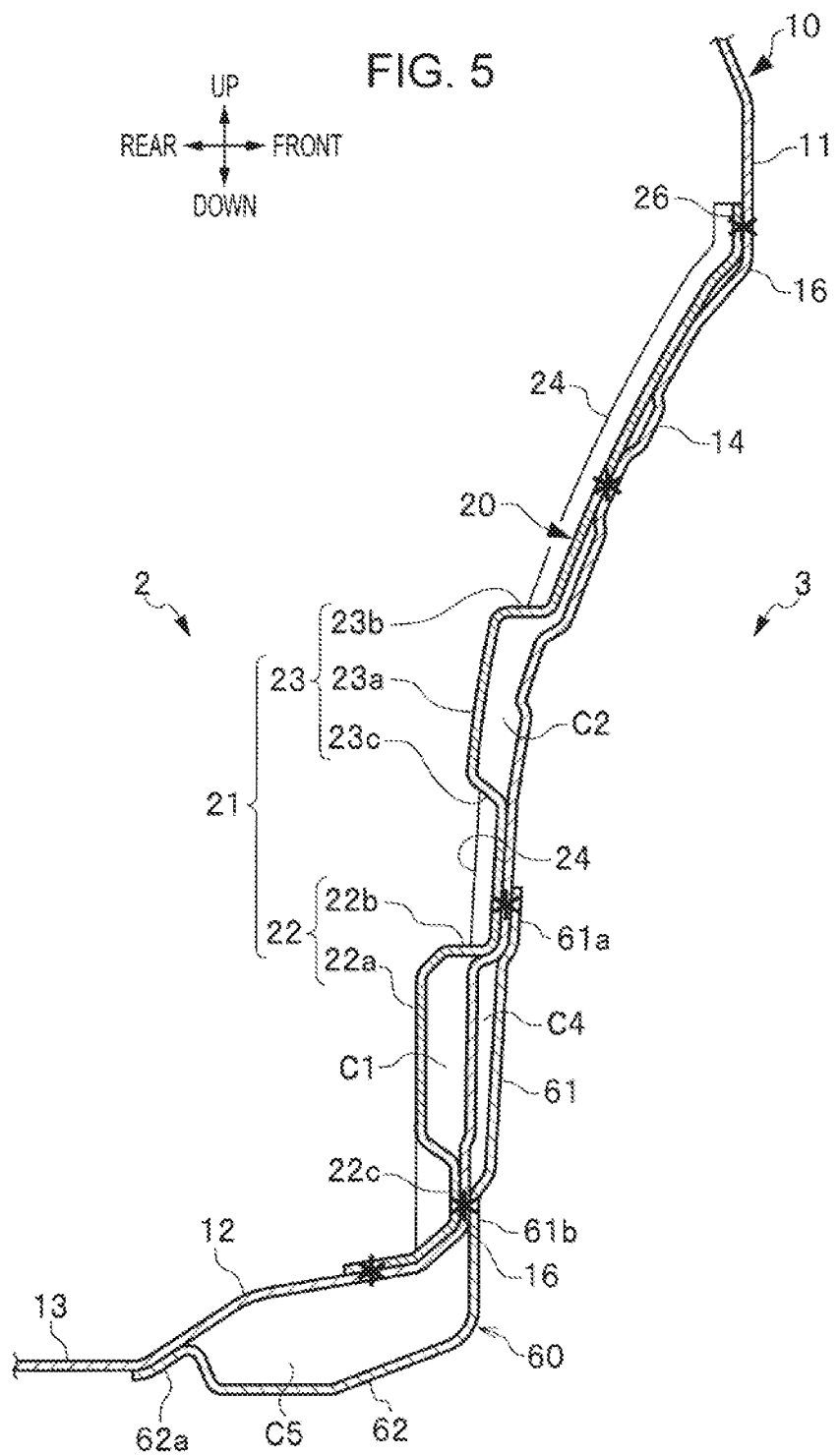
FIG. 5 is a vertical cross-sectional view viewed in a direction indicated by arrows V-V in FIG. 2.
Figure 6:
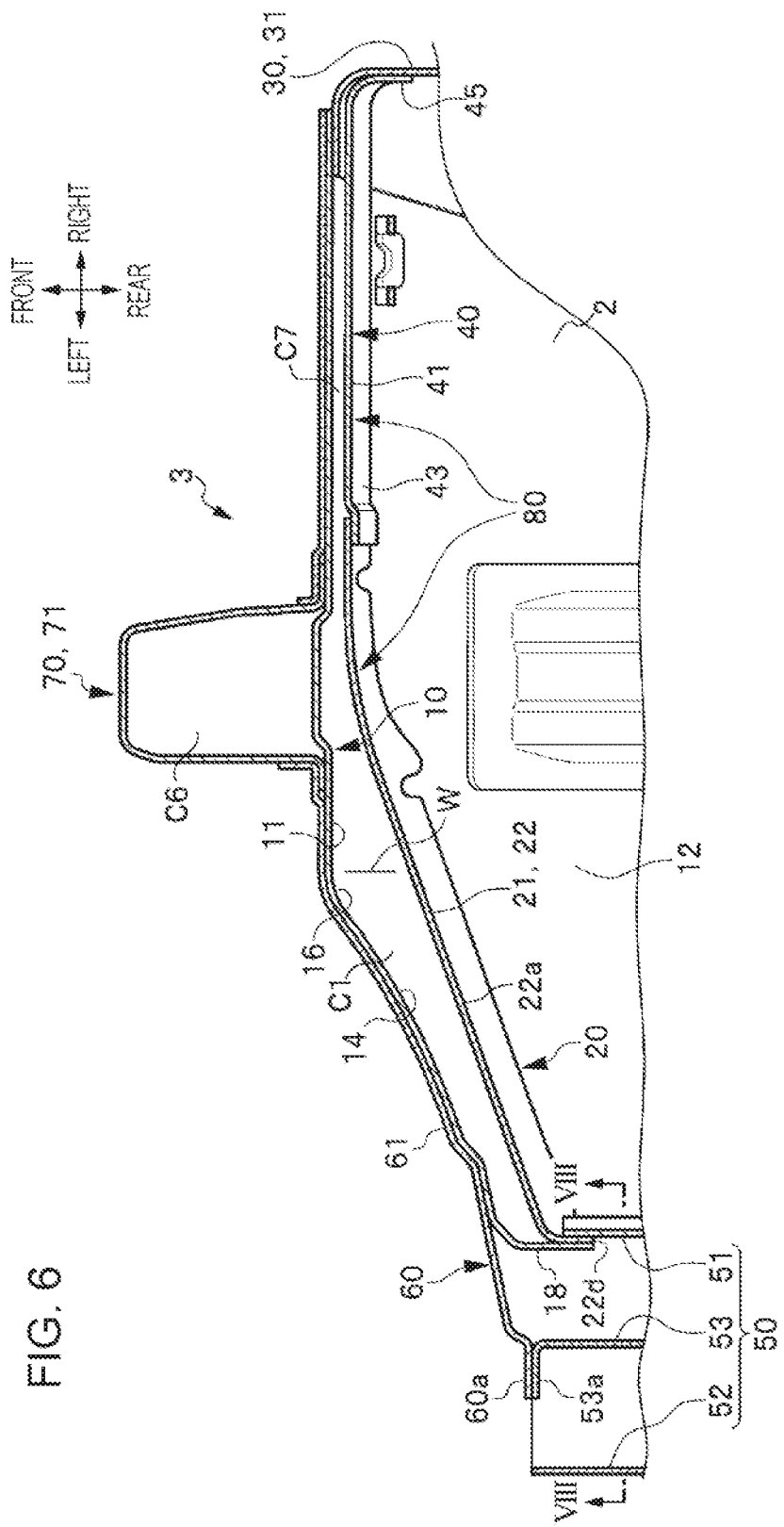
FIG. 6 is a horizontal cross-sectional view viewed in a direction indicated by arrows VI-VI in FIG. 2.

As illustrated in FIG. 4, FIG. 5, and FIG. 6, the first horizontal closed cross-section defining portion 22 has an inverted L-shape in vertical closed cross-sectional view and includes a vertical wall 22a, which extends in the vertical direction, and an upper wall 22b, which extends forward from an upper end of the vertical wall 22a. The first horizontal closed cross-section defining portion 22 extends along a lower section of the ridge 16, which is a border between the wheel-arch-shaped portion 14 and the sloping portion 12. The reinforcing panel 20 is connected to the dash floor panel 10 at positions above and below the first horizontal closed cross-section defining portion 22 by spot welding, for example. Thus, a first horizontal cross-section C1 is defined by inner surfaces of the first horizontal closed cross-section defining portion 22 and the wheel-arch-shaped portion 14, reinforcing the lower section of the wheel-arch-shaped portion 14. In addition, the vertical wall 22a includes a recess 22c, which is used for welding, at a position adjacent to the vehicle exterior. The first horizontal closed cross-section defining portion 22 includes a horizontal flange 22d extending rearward from the outer end portion in the vehicle width direction. The horizontal flange 22d is connected to the dash flange 18 from the side of the vehicle interior 2.

As illustrated in FIG. 4 and FIG. 5, the second horizontal closed cross-section defining portion 23, which has a groove-like shape opening to the front in vertical cross-sectional view, includes a vertical wall 23a, which extends in the vertical direction, an upper wall 23b, which extends forward from an upper end of the vertical wall 23a, and a lower wall 23c, which extends forward from a lower end of the vertical wall 23a. The second horizontal closed cross-section defining portion 23 extends in the vehicle width direction along a substantially vertical middle section of the wheel-arch-shaped portion 14. The reinforcing panel 20 is connected to the dash lower panel 10 at positions above and below the second horizontal closed cross-section defining portion 23 by spot welding, for example (indicated by "*" in FIG. 5). Thus, a second horizontal closed cross-section C2 is defined by inner surfaces of the second horizontal closed cross-section defining portion 23 and the wheel-arch-shaped portion 14, reinforcing the middle section of the wheel arched-shape portion 14.

Figure 7:
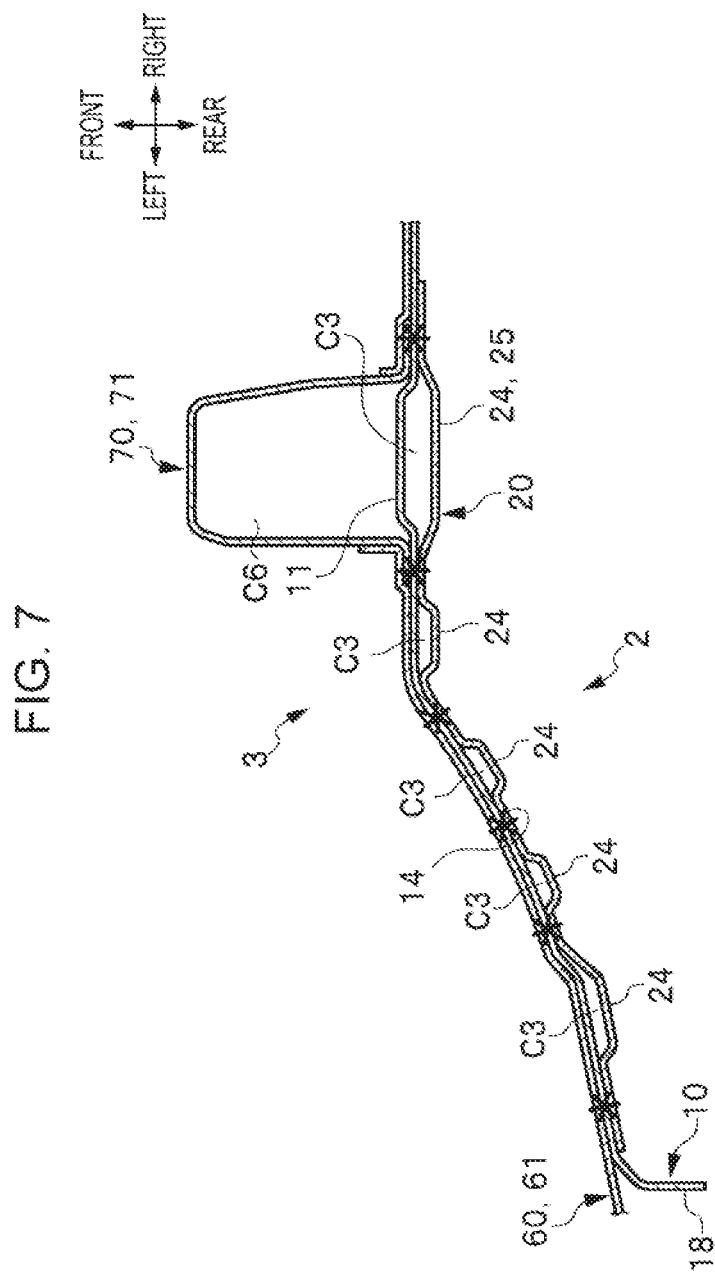
FIG. 7 is a horizontal cross-sectional view viewed in a direction indicated by arrows VII-VII in FIG. 2.

As illustrated in FIG. 4 and FIG. 7, the vertical closed cross-section defining portion 24 defines a vertical closed cross-section C3, which extends in the vertical direction, in combination with the wheel-arch-shaped portion 14. The vertical closed cross-section defining portion 24 is a portion of the reinforcing panel 20 and protrudes toward the vehicle interior 2. In this embodiment, the vertical closed cross-section defining portion 24 includes a plurality of vertical closed cross-section defining portions 24 positioned away from each other in the vehicle width direction. The number of vertical closed cross-section defining portions 24 is not limited. The vertical closed cross-section defining portions 24 each has a groove-like shape opening to the front in horizontal cross-sectional view. The vertical closed cross-section defining portion 24 protrudes less (has a smaller depth) than the horizontal closed cross-section defining portion 21.

Hereinafter, the innermost one of the vertical closed cross-section defining portions 24 in the vehicle width direction is referred to as an innermost vertical closed cross-section defining portion 25 in some cases.

The vertical closed cross-section defining portions 24 intersect the horizontal closed cross-section defining portion 21 (at substantially right angles in this embodiment). Specifically, the vertical closed cross-section defining portions 24 extend from the upper wall 22b of the first horizontal closed cross-section defining portion 22 to the lower wall 23c of the second horizontal closed cross-section defining portion 23. The vertical closed cross-section defining portions 24 except for the innermost vertical closed cross-section defining portion 25 further extend from the upper wall 23b of the second horizontal closed cross-section defining portion 23 to an upper edge portion 26 of the reinforcing panel 20. The innermost vertical closed cross-section defining portion 25 has a larger width than the other vertical closed cross-section defining portions 24.

As illustrated in FIG. 7, the reinforcing panel 20 is connected to the dash lower panel 10 by spot welding, for example, at positions on the left and right of the vertical closed cross-section defining portions 24 (as indicated by "*" in FIG. 7). Thus, the vertical closed cross-sections C3, which reinforce the wheel-arch-shaped portion 14 in the vertical direction, are defined by the vertical closed cross-section defining portions 24 and the wheel-arch-shaped portion 14. In addition, as illustrated in FIG. 4 and FIG. 5, the upper edge portion 26 of the reinforcing panel 20 is connected to the front plate 11 at a position above the ridge 16, which is a border between the front plate 11 and the wheel-arch-shaped portion 14 (at a position outside the wheel-arch-shaped portion 14). Thus, a portion around the ridge 16 is reinforced by the reinforcing panel 20.

As illustrated in FIG. 1, FIG. 2, and FIG. 3, the tunnel member 30 is connected to a middle portion in the vehicle width direction of the dash lower panel 10 (cutout 17). The tunnel member 30 has a groove-like shape (tunnel-like shape or inverted U-shape), which opens downward and protrudes upward, and extends in the front-rear direction. Components such as a propeller shaft, and an exhaust pipe, which are not illustrated, are housed inside (below) the tunnel member 30. The tunnel member 30 includes a front tunnel portion 31 at a front side and a rear tunnel portion 32 connected to a rear end of the front tunnel portion 31. The front tunnel portion 31 declines toward the rear. The rear tunnel portion 32 extends in a substantially horizontal direction. The front end portion and the lower end portion of the front tunnel portion 31 are connected to the edge portion of the cutout 17. The left and right end portions of the rear tunnel portion 32 are connected to inner end portions in the vehicle width direction of the floor panel.

As illustrated in FIG. 1, FIG. 4, and FIG. 6 (mainly FIG. 4), a horizontal member 40, which is a separate member from the reinforcing panel 20, is disposed so as to extend from the reinforcing panel 20 to the tunnel member 30. The horizontal member 40 constitutes a dash cross member 80 in combination with the first horizontal closed cross-section defining portion 22, which is the lowest closed cross-section defining portion 21. A high tensile steel plate is bent in a predetermined shape by a hot stamping process to obtain the horizontal member 40. The horizontal member 40 has a substantially inverted L-shape in vertical cross-sectional view and includes a horizontal member vertical wall 41, which extends in the vertical direction, a horizontal member upper wall 42, which extends forward from an upper end of the horizontal member vertical wall 41, a horizontal member lower flange 43, which extends obliquely downward toward the rear from an lower end of the horizontal member vertical wall 41, a horizontal member upper flange 44 extending obliquely upward to the front from an upper end of the horizontal member upper wall 42, and a horizontal member end flange 45 extending from an inner end in the vehicle width direction (end adjacent to the tunnel member 30) of the horizontal member 40 toward the vehicle interior 2 along a side wall of the tunnel member 30.

The horizontal member lower flange 43 is connected to the sloping portion 12 of the dash lower panel 10. The horizontal member upper flange 44 is connected to the front panel 11 of the dash lower panel 10. The horizontal member end flange 45 is connected to the side wall of the front tunnel member 31. An outer end portion in the vehicle width direction of the horizontal member 40 is connected to an inner end portion in the vehicle width direction of the first horizontal closed cross-section defining portion 22. In addition, a front end portion of the side sill 50, which is described in detail later, is connected to an outer end portion in the vehicle width direction of the first horizontal closed cross-section defining portion 22. The first horizontal closed cross-section defining portion 22, the horizontal member 40, and the dash lower panel 10 constitute a hollow dash cross member 80, which extends continuously in the vehicle width direction. A closed cross-section C7 defined by the horizontal member 40 is continuous with the closed cross-section C1 defined by the first horizontal closed cross-section defining portion 22. The dash cross member 80 connects the front end portions of the side sill 50 with the front end portion of the tunnel member 30. In other words, an outer end portion of the dash cross member 80, which is adjacent to the vehicle exterior, is supported by the front end portion of the side sill 50 and the middle portion of the dash cross member 80 is supported by the front end portion of the tunnel member 30. The dash cross member 80 is described in detail later.

Figure 8:
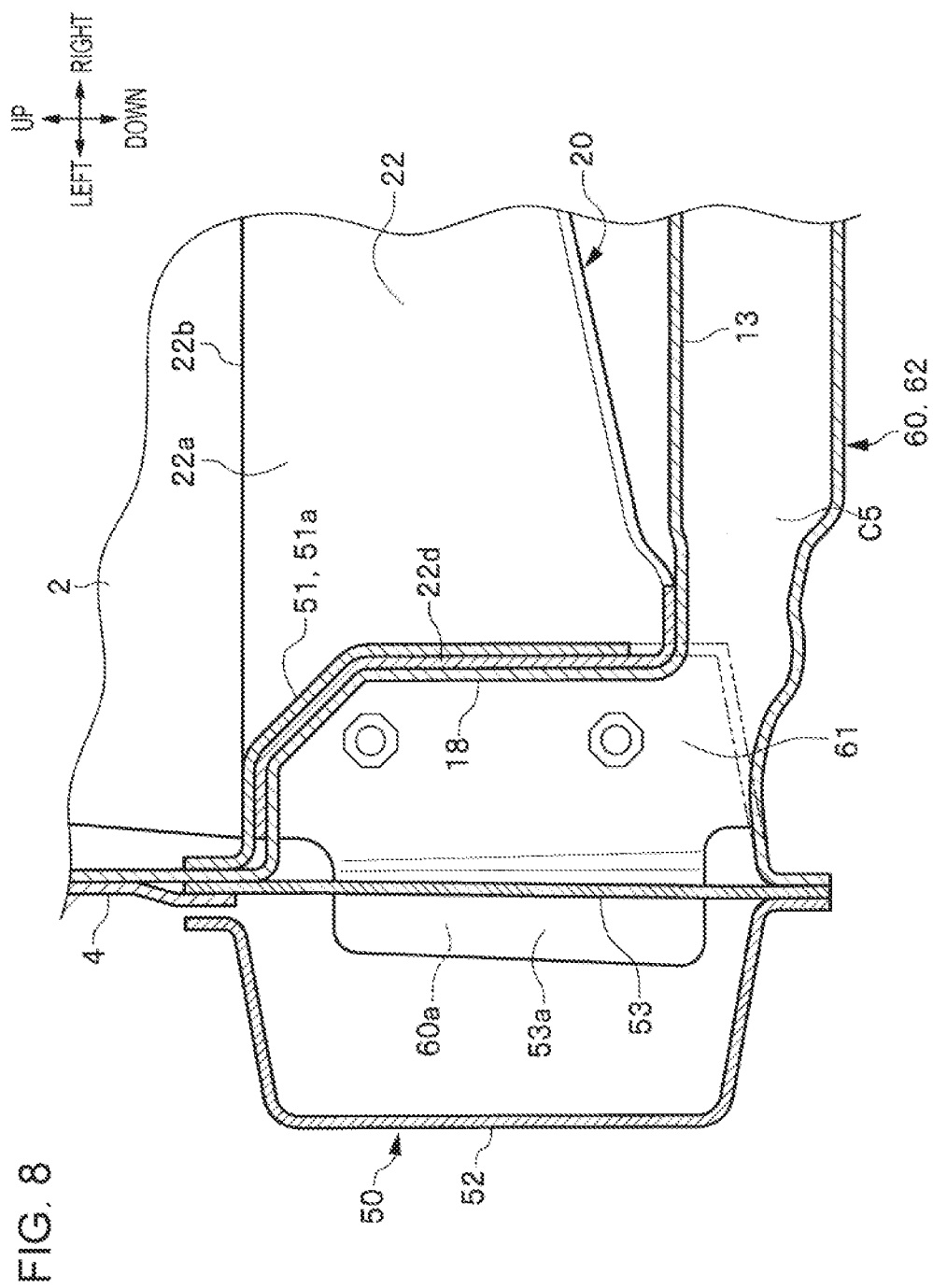
FIG. 8 is a vertical cross-sectional view viewed in a direction indicated by arrows VIII-VIII in FIG. 6.

As illustrated in FIG. 4, FIG. 6, and FIG. 8, the front end portion of each side sill 50 is connected to the end portion (left and right end portion) in the vehicle width direction of the dash lower panel 10. The side sill 50 is a hollow member extending in the front-rear direction and includes a side sill inner panel 51 on a vehicle interior 2 side and a side sill outer panel 52 on a vehicle exterior side. A jack-up stiffener 53 is disposed in the front end portion of the side sill 50 so as to extend in the front-rear direction at a position between the side sill inner panel 51 and the side sill outer panel 52.

As illustrated in FIG. 8, the front pillar lower section 4 is connected to the dash flange 18, which extends from an end portion in the vehicle width direction of the dash lower panel 10. The side sill 50 connects the lower end portion of the front pillar lower section 4 with the lower end portion of a center pillar, which is not illustrated.

As illustrated in FIG. 8, the side sill inner panel 51 basically has a groove-like shape (hat-like shape) opening toward the vehicle exterior in cross-sectional view. The front end portion 51a of the side sill inner panel 51 is overlapped on an inner surface of the horizontal flange 22d of the first horizontal closed cross-section 22, which is on the side of the vehicle interior 2. The front end portion 51a of the side sill inner panel 51, the horizontal flange 22d, and the dash flange 18 are connected to each other by spot welding (three-layer connection). In such a state, the front end portion 51a of the side sill inner panel 51 faces the rear surface of the vertical wall 22a of the first horizontal closed cross-section defining portion 22 (see FIG. 4 and FIG. 6). In this configuration, if the side sill inner panel 51 is disconnected from the horizontal flange 22d by a front collision, the vertical wall 22a of the first horizontal closed cross-section defining portion 22 will come in contact with the front end portion 51a of the side sill inner panel 51.

The shape and the structure of the side sill inner panel 51 are not limited. The side sill inner panel 51 may be separated into upper and lower components so as to sandwich the floor panel portion 13 and the floor panel therebetween.

A jack-up stiffener 53 reinforces the side sill 50 and supports a load during jacking up. An upper end portion and a lower end portion of the jack-up stiffener 53 are sandwiched between the side sill inner panel 51 and the side sill outer panel 52. The jack-up stiffener 53 includes a stiffener flange 53a extending outward in the vehicle width direction from the front end.

As illustrated in FIG. 3 and FIG. 5, outriggers 60 each extending in the vehicle width direction are connected to a surface of the dash lower panel 10 on a side of the power unit chamber 3. The outrigger 60 extends in the vehicle width direction on an opposite side of the dash lower panel 10 from the first horizontal closed cross-section defining portion 22. In other words, the outrigger 60 covers the lower section of the ridge 16 of the wheel-arch-shaped portion 14 from the side of the power unit chamber 3. The outriggers 60 define a plurality of closed cross-sections extending in the vehicle width direction in combination with the dash lower panel 10. The outrigger 60 has an outer end portion 60a in the vehicle width direction (see FIG. 6) positioned outward from the outer end portion in the vehicle width direction of the dash lower panel 10 (dash flange 18) and connected to the stiffener flange 53a of the jack-up stiffener 53. The inner end portion in the vehicle width direction of the outrigger 60 is connected to a bottom surface of a curved portion 71 of a front-side frame 70, which is described later.

As illustrated in FIG. 5, the outrigger 60 has an L-shape in vertical cross-sectional view and includes an outrigger vertical wall 61, which extends in the vertical direction, and an outrigger bottom wall 62, which extends rearward from the lower end of the outrigger vertical wall 61. The outrigger vertical wall 61 has an upper end 61a at a position between the first horizontal closed cross-section defining portion 22 and the second horizontal closed cross-section defining portion 23 and is connected to the reinforcing panel 20 with the wheel-arch-shaped portion 14 being disposed therebetween (three-layer connection) (at positions indicated by * in FIG. 5). A middle portion 61b in the vertical direction of the outrigger vertical wall 61 is connected to the recess 22c of the first horizontal closed cross-section defining portion 22 with the wheel-arch-shaped portion 14 being disposed therebetween (three-layer connection) at a position below the first horizontal closed cross-section defining portion 22 (near the lower section of the ridge 16 of the wheel-arch-shaped portion 14). A portion of the outrigger vertical wall 61 between the upper end portion 61a and the middle portion 61b is positioned away from the front surface of the wheel-arch-shaped portion 14. With this configuration, the wheel-arch-shaped portion 14 and the outrigger vertical wall 61 define an outrigger first closed cross-section C4 extending in the vehicle width direction at a position in front of the first horizontal closed cross-section defining portion 22 (on an opposite side of the dash lower panel 10 from the first horizontal closed cross-section defining portion 22). In other words, the first horizontal closed cross-section C1 and the outrigger first closed cross-section C4 provide one closed cross-section having a larger cross-sectional area, which is reinforced by the wheel-arch-shaped portion 14 disposed in the large closed cross-section.

The lower end portion of the outrigger vertical wall 61 is positioned below the lower section of the ridge 16 of the wheel-arch-shaped portion 14. The outrigger bottom wall 62 is positioned below the sloping portion 12. The outrigger bottom wall 62 includes an outrigger lower flange 62a having an inverted L-shape in cross-sectional view at the rear end portion. The outrigger lower flange 62a is connected to a portion of the dash lower panel 10 around a border between the sloping portion 12 and the floor panel 13. Thus, an outrigger second closed cross-section C5 is defined by the dash lower panel 10 and the outrigger bottom wall 62. With this configuration, the front side frame 70, which is described in detail later, and the side sill 50 are connected through a hollow structure having the outrigger first closed cross-section C4 and the outrigger second closed cross-section C5.

As illustrated in FIG. 3 and FIG. 9, two front side frames 70 extending in the front-rear direction are connected to the dash lower panel 10 on the side of the power unit chamber 3. Each of the front side frames 70 is a hollow framework having a substantially rectangular tubular shape and supports the power unit P, such as an engine, disposed over the front side frames 70. The front end portions of the front side frame 70 are connected to corresponding left and right ends of a bumper beam, which is not illustrated. The rear end portion of each of the front side frames 70 is connected to the front panel 11 and the sloping portion 12 of the dash lower panel 10 from the side of the power unit chamber 3. More specifically, a rear end portion of the front side frame 70 includes a curved portion 71, which extends downward along the front panel 11 and the sloping portion 12. The curved portion 71 has a groove-like shape (hat-like shape) opening rearward (or upward) in cross-sectional view. The curved portion 71 connected to the dash lower panel 10 defines a front closed cross-section C6 extending in the front-rear direction in combination with the front panel 11 and the sloping portion 12. The innermost vertical closed cross-section defining portion 25 of the reinforcing panel 20 is positioned on an opposite side of the dash lower panel 10 from the curved portion 71 (specifically, an upper half section of the curved portion 71).

An attachment 72 for attaching a mount (not illustrated) of the power unit P is disposed on a lower surface of the curved portion 71. Stiffeners 73 and 74 are disposed on an inner surface of the curved portion 71 at positions in front of and behind the attachment 72. The stiffeners 73 and 74 are reinforcing plate members and divide the front closed cross-section C6 into front and rear sections. The upper end portions of the stiffeners 73 and 74 are connected to the dash lower panel 10 and the lower end portions of the stiffeners 73 and 74 are connected to the curved portion 71.

As illustrated in FIG. 4 and FIG. 6, the upper wall 22b of the first closed cross-section defining portion 22 has the maximum width W in the front-rear direction at the position corresponding to the ridge 16, which is the border between the sloping portion 12 as the general portion 15 and the wheel-arch-shaped portion 14. More specifically, the rear edge of the upper wall 22b (i.e., the vertical wall 22a) extends substantially linearly and obliquely rearward toward the vehicle exterior. The front end portion of the upper wall 22b extends along the sloping portion 12 and the rear surface of the wheel-arch-shaped portion 14. The sloping portion 12 facing the front end portion of the upper wall 22b extends in a direction substantially perpendicular to the front-rear direction (left-right direction). A portion of the wheel-arch-shaped portion 14 facing the front end of the upper wall 22b protrudes in an arc toward the vehicle interior 2 and extends obliquely rearward toward the vehicle exterior. With this configuration, the distance between the dash cross member 80 or the vertical wall 22a and the dash lower panel 10 is the longest at a position corresponding to the ridge 16, which is the border between the wheel-arch-shaped portion 14 and the sloping portion 12. Thus, the dimension of the upper wall 22b in the front-rear direction is the largest at the portion corresponding to the ridge 16.

The vehicle body structure 1 according to the present embodiment basically has the above-described configuration. Advantages of the vehicle body structure 1 are described hereinafter.

As illustrated in FIG. 4, FIG. 5, and FIG. 7, in the vehicle body structure 1 according to the present embodiment, the reinforcing panel 20 includes the first and second horizontal closed cross-section defining portions 22 and 23, which define the closed cross-sections (first and second closed cross-sections C1 and C2) extending in the vehicle width direction in combination with the wheel-arch-shaped portion 14. The reinforcing panel 20 further includes the plurality of vertical closed cross-section defining portions 24, which define the closed cross-sections (vertical closed cross-section C3) extending in the vertical direction in combination with the wheel-arch-shaped portion 14. The vertical closed cross-sections 24 are perpendicular to or intersect the first and second horizontal closed cross-section defining portions 22 and 23. In other words, the wheel-arch-shaped portion 14 and the reinforcing panel 20 constitute a cross-like or grid-like closed cross-section in front view. With this configuration, the reinforcing panel 20 improves the rigidity and strength of the wheel-arch-shaped portion 14 in the vehicle width direction and the vertical direction, i.e., the rigidity and strength of the overall wheel-arch-shaped portion 14. The reinforcing panel 20 having the above-described configuration reduces deformation of the wheel-arch-shaped portion 14 toward the vehicle interior 2 when the front wheel collides with the wheel-arch-shaped portion 14 due to a narrow offset collision (small overlap collision) or an oblique collision. In addition, the number of components does not increase, since the reinforcing panel 20 integrally includes the horizontal closed cross-section defining portions 21 and the vertical closed cross-section defining portions 24. In addition, the thickness of the reinforcing panel 20 does not increase, since the rigidity and strength of the reinforcing panel 20 is improved by the configuration in which the horizontal closed cross-section defining portions 21 and the vertical closed cross-section defining portions 24 intersect each other.

As illustrated in FIG. 6, the first horizontal closed cross-section defining portion 22, which is the lowest horizontal closed cross-section defining portion 21 constitutes the dash cross member 80, which extends from the side sill 50 to the tunnel member 30, in combination with the horizontal member 40, which is a separate member. With this configuration, the dash cross member 80 improves the rigidity and strength of the components between the side sill 50 and the tunnel member 30. Thus, the dash cross member 80 prevents the power unit P from moving further rearward during a collision if moved rearward due to the collision, for example.

As illustrated in FIG. 6 and FIG. 8, the first horizontal closed cross-section defining portion 22 includes the horizontal flange 22d extending rearward from the outer end portion in the vehicle width direction. The front end portion 51a of the side sill inner panel 51 is connected to an inner surface in the vehicle width direction of the horizontal flange 22d in an overlapped state. Thus, if the horizontal flange 22d is detached from the side sill inner panel 51 due to a collision, the vertical wall 22a of the first horizontal closed cross-section defining portion 22 will come in contact with the front end portion 51a of the side sill inner panel 51, and thus the side sill 50 will support the collision load.

As illustrated in FIG. 6 and FIG. 8, the jack-up stiffener 53 includes the stiffener flange 53a extending outwardly in the vehicle width direction from the front end portion and connected to the outer end portion in the vehicle width direction of the outrigger 60 in an overlapped state. In such a state, the first closed cross-section C1 extending in the vehicle width direction, which is defined by the dash lower panel 10 and the first horizontal closed cross-section defining portion 22, is connected to the front end portion of the closed cross-section (i.e., closed cross-section of the side sill) extending in the front-rear direction, which is defined by the jack-up stiffener 53 and the side sill inner panel 51, through the outrigger 60. With this configuration, a load is properly transmitted from the dash cross member 80, which has the closed cross-section extending in the vehicle width direction, to the side sill 50, which has the closed cross-section extending in the front-rear direction.

As illustrated in FIG. 7 and FIG. 9, the innermost vertical closed cross-section defining portion 25, which is one of the vertical closed cross-section defining portions 24, is positioned on an opposite side of the dash lower panel 10 from the curved portion 71 of the front side frame 70. With this configuration, the curved portion 71 is reinforced by the innermost vertical closed cross-section defining portion 25. This configuration enables the front side frame 70 to be properly deformed during a narrow offset collision or a front collision to effectively absorb impact energy and this configuration reduces deformation of the dash lower panel 10 toward the vehicle interior 2.

As illustrated in FIG. 5, the reinforcing panel 20 is connected to the outrigger 60 at the positions above and below the first horizontal closed cross-section defining portion 22 with the wheel-arch-shaped portion 14 being disposed therebetween, and the outrigger 60 defines the first outrigger closed cross-section C4, which extends in the vehicle width direction, in combination with the wheel-arch-shaped portion 14 at a position in front of the first horizontal closed cross-section defining portion 22. In such a state, two closed cross-sections (first horizontal closed cross-section C1 and the outrigger first closed cross-section C4) each extending in the vehicle width direction are arranged in the front-rear direction with the wheel-arch-shaped portion 14 being disposed therebetween. This configuration improves the rigidity and strength of the wheel-arch-shaped portion 14, reducing deformation of the wheel-arch-shaped portion 14.

In the present embodiment, the reinforcing panel 20 is formed by a hot stamping process. The hot stamping process is also referred to as a hot pressing process, in which a steel plate, which is heated to be softened, is subjected to a pressing process and hardened at the same time by a cooling effect due to contact with a metal die. The heating of the steel plate for softening reduces spring back of the steel plate, improving dimensional accuracy, and the hardening improves strength of the produced member. With this configuration, less dimensional error occurs in the reinforcing panel 20 integrally including the first and second closed cross-section defining portions 22 and 23, which extend in the vehicle width direction, and the vertical closed cross-section defining portions 24, which extend in the vertical direction and intersect the first and second closed cross-section defining portions 22 and 23. In addition, both the improvement in rigidity and strength and the reduction in weight are achieved, since the reinforcing panel 20 has higher strength due to the hardening.

As illustrated in FIG. 5, the upper edge portion 26 of the reinforcing panel 20 is connected to the front panel 11 at the position above the ridge 16, which is the border between the front panel 11 and the wheel-arch-shaped portion 14 (outside the wheel-arch-shaped portion 14). With this configuration, the reinforcing panel 20 reinforces a portion around the ridge 16. This configuration reduces deformation of the wheel-arch-shaped portion 14 toward the vehicle interior 2 during a collision.

As illustrated in FIG. 4 and FIG. 6, the upper wall 22b of the first horizontal closed cross-section defining portion 22 has the maximum width in the front-rear direction at the portion corresponding to the ridge 16, which is the border between the sloping portion 12 as the general portion 15 and the wheel-arch-shaped portion 14. This configuration effectively reinforces the portion around the ridge 16 where stress concentrates and reduces protrusion of the first horizontal closed cross-section defining portion 22 toward the vehicle interior 2 to provide a larger vehicle interior space.

The vehicle body structure 1 according to the present disclosure is described above in detail with reference to the drawings. However, the present disclosure is not limited to the description and may be modified without departing from the gist of the present disclosure.

The left and right reinforcing panels 20 are not necessarily symmetric, for example. In the embodiment, the upper edge portion 26 of the reinforcing panel 20 on the right (side of the front passenger seat) is connected to a portion below the upper section of the ridge portion 16 of the wheel-arch-shaped portion 14.

The number of horizontal closed cross-section defining portions 21 and the number of vertical closed cross-section defining portions 24 of the reinforcing panel 20 are not limited. The reinforcing panel 20 may include one horizontal closed cross-section defining portion and one vertical closed cross-section defining portion, which intersect each other, for example.

A method of forming the reinforcing panel 20 is not limited to the hot stamping process, and may be a widely used pressing process, for example. In addition, a material of the reinforcing panel 20 is not limited to the steel plate, and may be a carbon fiber reinforced resin member. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle body structure comprising:
a dash lower panel including a wheel-arch-shaped portion that constitutes a portion of a wheel arch, the dash lower panel partitioning a power unit chamber from a vehicle interior;
a reinforcing panel covering a vehicle interior side of the wheel-arch-shaped portion; and
a side sill extending in a front-rear direction and having a front end portion connected to an end portion in a vehicle width direction of the dash lower panel, wherein
the reinforcing panel includes:
a horizontal closed cross-section defining portion that defines a closed cross-section extending in the vehicle width direction, together with the wheel-arch-shaped portion and
a vertical closed cross-section defining portion that defines a closed cross-section extending in a vertical direction, together with the wheel-arch-shaped portion, the horizontal closed cross-section defining portion and the vertical closed cross-section defining portion intersecting each other.

2. The vehicle body structure according to claim 1, further comprising a tunnel member connected to a middle portion of the dash lower panel in the vehicle width direction, wherein
the horizontal closed cross-section defining portion includes at least two horizontal closed cross-section defining portions positioned away from each other in the vertical direction, and
a lowest one of the horizontal closed cross-section defining portions constitutes a dash cross member in combination with a horizontal member, the dash cross member extending from the side sill to the tunnel member, the horizontal member is a separate member from the horizontal closed cross-section defining portions.

3. The vehicle body structure according to claim 1, wherein the side sill has a hollow shape and includes a side sill inner panel on an inner side in the vehicle width direction and a side sill outer panel on an outer side in the vehicle width direction, the side sill inner panel and the side sill outer panel constituting the hollow shape of the side sill,
the horizontal closed cross-section defining portion includes a flange bent rearward from an outer end portion in the vehicle width direction, and a front end portion of the side sill inner panel is connected to an inner surface in the vehicle width direction of the flange in an overlapped state.

4. The vehicle body structure according to claim 3, further comprising an outrigger extending in the vehicle width direction and disposed on an opposite side of the dash lower panel from the horizontal closed cross-section defining portion; and
    a jack-up stiffener disposed in a front end portion of the side sill, the jack-up stiffener extending in a front-rear direction at a position between the side sill inner panel and the side sill outer panel, wherein
    the jack-up stiffener includes a stiffener flange bent in the vehicle width direction from a front end thereof and connected to an outer end portion in the vehicle width direction of the outrigger in an overlapped state.

5. The vehicle body structure according to claim 1, further comprising a front side frame extending in a front-rear direction in the power unit chamber and having a rear end portion connected to the dash lower panel, wherein
    the rear end portion of the front side frame has a curved portion that extends downward and defines a closed cross-section together with the dash lower panel, and
    the vertical closed cross-section defining portion is disposed on an opposite side of the dash lower panel from the curved portion.

6. The vehicle body structure according to claim 1, further comprising an outrigger extending in the vehicle width direction and disposed on an opposite side of the dash lower panel from the horizontal closed cross-section defining portion, wherein
    the reinforcing panel is connected to the outrigger at positions above and below the horizontal closed cross-section defining portion respectively with the wheel-arch-shaped portion being interposed between the reinforcing panel and the outrigger, and
    the outrigger defines a closed cross-section disposed in front of the horizontal closed cross-section defining portion, together with the wheel-arch-shaped portion.

7. The vehicle body structure according to claim 1, wherein the reinforcing panel is formed by a hot stamping process.

8. The vehicle body structure according to claim 1, wherein the dash lower panel includes a ridge that defines a boundary of the wheel-arch-shaped portion in the dash lower panel, and
    an upper edge portion of the reinforcing panel is connected to the dash lower panel at a position outside the ridge with respect to the wheel-arch-shaped portion.

9. The vehicle body structure according to claim 1, wherein the horizontal closed cross-section defining portion includes an upper wall extending in the front-rear direction and in the vehicle width direction, wherein
    the upper wall has a maximum width in the front-rear direction at a position corresponding to a ridge that defines a border of the wheel-arch-shaped portion in the dash lower panel.

10. The vehicle body structure according to claim 1, wherein the horizontal closed cross-section defining portion defines the closed cross-section together with a vehicle interior side surface of the wheel-arch-shaped portion and the vertical closed cross-section defining portion defines the closed cross-section together with the vehicle interior side surface of the wheel-arch-shaped portion.

11. The vehicle body structure according to claim 1, wherein the horizontal closed cross-section defining portion includes a plurality of the horizontal closed cross-section defining portions positioned away from each other in the vertical direction, and the vertical closed cross-section defining portion includes a plurality of the vertical closed cross-section defining portions positioned away from each other in the vehicle width direction.

12. The vehicle body structure according to claim 1, wherein the lowest one of the horizontal closed cross-section defining portion includes an inner end connected to the horizontal member.

13. The vehicle body structure according to claim 3, wherein a tip end of the front end portion of the side sill faces a corner located between the flange and the horizontal closed cross-section defining portion.

14. The vehicle body structure according to claim 4, wherein the stiffener flange of the jack-up stiffener is connected to a rear surface of the outrigger.

15. The vehicle body structure according to claim 5, wherein the curved portion of the front side frame defines the closed cross-section together with a front side surface of the dash lower panel.

16. The vehicle body structure according to claim 8, wherein the wheel-arch-shaped portion bulges toward the vehicle interior by bending the dash lower panel along the ridge.

17. The vehicle body structure according to claim 1, wherein the horizontal closed cross-section defining portion protrudes toward the vehicle interior and the vertical closed cross-section defining portion protrudes toward the vehicle interior, and the vertical closed cross-section defining portion protrudes less than the horizontal closed cross-section defining portion.

* * * * *